United States Patent
Kouno et al.

Patent Number: 5,880,802
Date of Patent: Mar. 9, 1999

[54] ACTIVE MATRIX LIQUID CRYSTAL DISPLAY HAVING INSULATING LAYER LARGER THAN DISPLAY ELECTRODE AND SMALLER THAN VIDEO LINE IN THICKNESS

[75] Inventors: Hiroaki Kouno, Daitou; Susumo Oima, Ohgaki; Yasuo Segawa, Gifu; Norio Tabuchi, Ichinomiya; Shouzou Ohura, Motosu; Hiroki Hamada, Hirakata; Kiyoshi Yoneda, Motosu, all of Japan

[73] Assignee: Sanyo Electric Co., Ltd., Osaka, Japan

[21] Appl. No.: 622,840

[22] Filed: Mar. 27, 1996

[30] Foreign Application Priority Data

Mar. 27, 1995 [JP] Japan ................... 7-068252
Mar. 21, 1996 [JP] Japan ................... 8-064941

[51] Int. Cl.⁶ ............ G02F 1/1333; G02F 1/1343; G02F 1/141
[52] U.S. Cl. ............ 349/138; 349/38; 349/133
[58] Field of Search ................ 349/38, 39, 133, 349/138

[56] References Cited

U.S. PATENT DOCUMENTS

| | | | |
|---|---|---|---|
| 5,303,072 | 4/1994 | Takeda et al. | 349/38 |
| 5,396,262 | 3/1995 | Hastings, III | 349/39 |
| 5,398,127 | 3/1995 | Kubota et al. | 349/42 |
| 5,422,749 | 6/1995 | Hanyu et al. | 349/135 |
| 5,468,684 | 11/1995 | Yoshimori et al. | 438/3 |
| 5,517,342 | 5/1996 | Kim et al. | 349/43 |
| 5,668,613 | 9/1997 | Kim et al. | 349/43 |

FOREIGN PATENT DOCUMENTS

| | | |
|---|---|---|
| 55-74517 | 6/1980 | Japan . |
| 58-50514 | 3/1983 | Japan . |
| 60-178425 | 9/1985 | Japan . |

OTHER PUBLICATIONS

Japanese Publication No. 55074517 A, dated Jun. 5, 1980.
Japanese Publication No. 58050514 A, dated Mar. 25, 1983.
Japanese publication No. 60178425 A, Sep. 12, 1985.

*Primary Examiner*—William L. Sikes
*Assistant Examiner*—Tarifur R. Chowdhury
*Attorney, Agent, or Firm*—Nikaido, Marmelstein, Murray & Oram LLP

[57] ABSTRACT

An active matrix liquid crystal display improves its contrast by suppressing irregularity of an alignment film caused by video lines thereby reducing reverse regions on a display electrode. The active matrix liquid crystal display has first and second opposite substrates, a video line, an active element and a display electrode which are directly or indirectly formed on the first substrate, and an alignment film which is formed on or above the video line, the active element and the display electrode. The alignment film is so formed that its surface is at an angle of inclination of not more than 10.5° with respect to the display electrode surface between the video line and the display electrode.

4 Claims, 12 Drawing Sheets

ACTIVE MATRIX LIQUID CRYSTAL DISPLAY HAVING INSULATING LAYER LARGER THAN DISPLAY ELECTRODE AND SMALLER THAN VIDEO LINE IN THICKNESS

BACKGROUND OF THE INVENTION

1. Field of the Invention

The present invention relates to an active matrix liquid crystal display which is applied to an office automation apparatus or a measuring instrument as a display.

2. Description of the Background Art

A liquid crystal display may present such a phenomenon, called reversal, that a region exhibiting orientation which is different from that in a display electrode, i.e., a reverse region, is formed around the display electrode to reduce the contrast of the liquid crystal display.

As to the reversal of a simple matrix liquid crystal display, known are such a phenomenon that strip-shaped reverse regions extending from a display electrode in three directions are formed by an electric field which obliquely extends between opposite electrodes (Japanese Patent Laying-Open No. 55-74517 (1980)), and a phenomenon causing strip-shaped reverse regions along two sides of a display electrode on its inclined surfaces (Japanese Patent Laying-Open No. 58-50514 (1983)).

On the other hand, a method of preparing a liquid crystal display including a step of rubbing an alignment film from a display electrode toward an active element (Japanese Patent Laying-Open No. 60-178425 (1985)) is proposed as a method of eliminating a reverse region in an active matrix liquid crystal display.

Even if the method described in this prior art is employed, however, the reversal in the active matrix liquid crystal display is not necessarily completely eliminated.

SUMMARY OF THE INVENTION

An object of the present invention is to provide an active matrix liquid crystal display having improved visibility by overcoming the aforementioned disadvantage of the prior art and suppressing irregularity of an alignment film caused by video lines which are increased in thickness due to requirement for low resistance, thereby reducing reverse regions on a display electrode.

The inventor has studied the aforementioned reversal in the conventional active matrix liquid crystal display, and discovered that irregularity of an alignment film provided on video lines which are increased in thickness due to requirement for low resistance is largely concerned with occurrence of the reversal.

With reference to FIGS. 10 to 12, the reversal in the conventional active matrix liquid crystal display is now described.

FIG. 10 is a plan view showing the conventional active matrix liquid crystal display. As shown in FIG. 10, a picture signal is supplied to Al video lines 1 of 2 $\mu$m in thickness by a horizontal scanning shift resistor of polycrystalline Si which outputs successively shifted pulses, while a scanning signal is supplied to Ta scanning lines 2 of 2000 Å in thickness by a vertical scanning shift resistor of polycrystalline Si every horizontal scanning period.

Further, coplanar TFTs 3 of polycrystalline Si are formed in the vicinity of intersections between the scanning lines 2 and the video lines 1, for controlling cutoff and conduction of the picture signal which is transmitted to ITO display electrodes 4 of 700 Å in thickness from the video lines 1 through the TFTs 3.

When nematic liquid crystals are employed in practice in the active matrix liquid crystal display shown in FIG. 10, it is necessary to provide a pair of polarizing plates on outer sides of the stacking direction, while these polarizing plates are not shown in FIG. 10. Throughout this specification, description is made with omission of such polarizing plates.

When an alignment film of 1000 Å in thickness which is provided on the display electrodes 4 enclosed with the scanning lines 2 and the video lines 1 is rubbed in a rubbing direction 5 from the TFTs 3 serving as active elements toward the display electrodes 4, reverse regions 6 are formed as shown in a hatched manner in FIG. 10.

In general, a boundary of the reverse region 6 in each display electrode 4 is called a transition line 7, and the distances between the transition line 7 and respective sides of the display electrode 4 are generally different from each other. In other words, the reverse region 6 is varied in width on the sides of the video and scanning lines 1 and 2.

Assuming that the surface of the alignment film which is formed on each display electrode 4 has an angle $\theta$ of inclination of 80°, the widths of the reverse region 6 are expressed by dropout distances a and b on the sides of the video and scanning lines 1 and 2 in FIG. 10 as follows:

TABLE 1

| Angle of Inclination $\theta$ | Dropout Distance on Video Line Side a | Dropout Distance on Scanning Line Side b |
|---|---|---|
| 80 | 10 | 8 |

When the display electrode is originally for black display in Table 1, the reverse region in white display, to reduce visibility of the liquid crystal display. Such white display of the reverse region is an unpreferable phenomenon, and hence expressed as "dropout" as shown in Table 1.

It is clearly understood from Table 1 that the dropout distance a on the side of the video line 1 which is ten times the scanning line 2 in thickness has a larger value of 10 $\mu$m as compared with the dropout distance b on the side of the scanning line 2.

Accordingly, only the dropout distance a on the video line side is noted in the following description.

Referring to FIG. 10, the surface state of the alignment film is hard to understand. Therefore, the following description is made with reference to FIG. 11 showing a section of the active matrix liquid crystal display taken along the line XI—XI in FIG. 10.

FIG. 11 is a sectional view of the aforementioned active matrix liquid crystal display causing the phenomenon called reversal or dropout. As shown in FIG. 11, the surface of a portion of the alignment film 8 which is positioned between the display electrode 4 and the video line 1 is inclined at an angle $\theta$ of 80° toward the video line 1.

In the vicinity of the aforementioned inclined surface of the alignment film 8, liquid crystals 9 are so reversely arranged that the reversely arranged liquid crystal molecules reach the interior of an upper region of the display electrode 4. The reverse region 6 on the side of the video line 1 shown in FIG. 10 is formed by the reversely arranged liquid crystal molecules which are positioned on the upper region of the display electrode 4, leading to observation of the dropout having the aforementioned dropout distance a.

In the aforementioned active matrix liquid crystal display, a gate insulating film 10 of silicon oxide and a TFT substrate 11 of glass are arranged under the display electrode 4. A counter alignment film 13 and a counter substrate 14 are formed on both sides of a counter electrode 12, which is opposed to the display electrode 4, along the stacking direction. Further, polarizing plates (not shown) are arranged on both sides of a pair of substrates, consisting of the TFT substrate 11 and the counter substrate 14, along the stacking direction.

In order to indicate the degree of the aforementioned dropout on the display electrode 4, description is now made with reference to FIG. 12 through a distance d from an end 4a of the display electrode 4. The distance d from the end 4a of the display electrode 4 has been calculated from an actual distance in case of preparing the aforementioned polarizing plates from HC2-8218 (trade name) by Kabushiki Kaisha Sanrittsu having parallel transmittance of 31% and orthogonal transmittance of 3% at a wavelength of 580 nm by expressing the parallel transmittance of 31% in terms of transmittance T of 100%.

While FIG. 11 illustrates the liquid crystals 9 in the form of a monomolecular provided between the alignment film 8 and the counter alignment film 13, a plurality of liquid crystal molecules are arranged between the alignment film 8 and the counter alignment film 13 along the direction of thickness in practice. FIG. 11 illustrates the liquid crystals 9 in the aforementioned manner in order to clearly show the influence exerted by the alignment film 8. FIGS. 1, 3 and 5 to 8 also sketchily illustrate liquid crystal molecules, for the same reason as the above.

FIG. 12 is a characteristic diagram showing the dependence of the transmittance T on the distance d from the end 4a of the display electrode 4. Referring to FIG. 10, the width (the dimension along the distance d) of the display electrode 4 is set at 100 $\mu$m, while the video line 1 is set as being approximate on the side having the large distance d.

As shown in FIG. 12, the transmittance is abruptly changed around the distance d of 94 to 95 $\mu$m, and when the distance d is in excess of this, it is understood that the transmittance curve becomes to be a parabolic curve, the upper side of which is a convex side, so that the reverse region wherein the transmittance is about 70% at most is formed. In practice, the distance d causing the abrupt change of the transmittance T in the aforementioned manner was 94 $\mu$m in picture processing data, and 95 $\mu$m in visual observation.

The difference of about 1 $\mu$m between the picture processing data and the visual data is conceivably caused since the human eyes are sensitive to a brighter region and tend to observe the boundary on the average.

As understood from FIG. 12, the transmittance T is increased in the reverse region, in correspondence to the phenomenon called "dropout".

There is such a tendency that the contrast of the liquid crystal display is necessarily reduced when a reverse region or a dropout phenomenon is caused on its display electrode.

According to a wide aspect of the present invention, provided is an active matrix liquid crystal display comprising a first substrate, a display electrode which is formed on the first substrate, an electrode which is formed at least either on a part under or on a side of the display electrode on the first substrate, an alignment film which is formed to cover the display electrode, a second substrate which is opposed to the first substrate, a counter alignment film which is formed on a surface of the second substrate facing the first substrate, and liquid crystals which are held between the alignment film and the counter alignment film. The alignment film has a surface which is inclined from a flat surface portion on the display electrode toward a portion above that provided with the electrode, and an angle of inclination of the inclined surface of the alignment film is not more than 10.5°, preferably not more than 7°, with respect to the flat surface portion.

Although the active matrix liquid crystal display according to the present invention an inclined surface is formed in the alignment film due to existence of the electrode formed at least either on a part under or on a side of the display electrode, the alignment film surface is smoothly inclined at an angle of not more than 10.5°, preferably 7°, as hereinabove described. Therefore, the reversal energy of the liquid crystals which are in contact with the smoothly inclined portion of the alignment film is extremely reduced. Consequently, formation of reverse regions is effectively suppressed not only on a scanning line side but on the video line side in an upper region of the display electrode. Thus, the ratio of a light transmitting portion to a light intercepting portion in transmittance, i.e., the contrast, is so improved that an active matrix liquid crystal display which can display clearer images can be provided. In the active matrix liquid crystal display according to the present invention, therefore, the display electrode can be further approached to the video line, thereby improving the numerical aperture of the liquid crystal display.

In the present invention, it is assumed that the aforementioned flat surface portion of the alignment film on the display electrode indicates a flat portion of the surface of the alignment film which is positioned on a principal plane of the display electrode, and that the aforementioned inclined surface indicates an inclined region of the surface of the alignment film from a portion which is inclined with respect to the flat surface portion due to the presence of the electrode to a portion which is parallel to the flat surface portion again.

According to a specific aspect of the present invention, the electrode which is formed at least either on a part under or on a side of the display electrode is a video line, and this video line is arranged on a side of the display electrode. In this case, it comes to that the inclined surface is formed from the alignment film located on the display electrode toward an upper portion of the video line which is arranged on a side of the display electrode.

According to another specific aspect of the present invention, the alignment film which is in contact with the liquid crystals is formed by a single-layer film. Thus, a flat alignment film is formed by a single layer, whereby elimination of reverse regions can be achieved in a simple structure.

According to still another specific aspect of the present invention, a SOG layer which is prepared by a spin-on-glass method are formed between the display electrode and the alignment film. According to this structure, the transmittance can be improved since the smooth SOG film is almost achromatic. In addition, a plurality of SOG layers may be formed between the display electrode and the alignment film.

According to a further specific aspect of the present invention, an insulating layer which is larger than the display electrode and smaller than the video line in thickness is further provided between the video line and the display electrode. In this case, the insulating layer having an intermediate thickness is formed between the video line and the display electrode, whereby the alignment film which is formed on the display electrode can be reduced in thickness, thereby improving the transmittance.

According to a further specific aspect of the present invention, a BPSG layer (borophosphosilicate glass layer) and an SOG layer are formed between the display electrode and the alignment film, whereby change in withstand voltage of the insulating film can be reduced and the withstand voltage across the display electrode and the counter electrode can be improved.

According to a further specific aspect of the present invention, an electrode which is partially formed under the aforementioned display electrode is an storage capacitive electrode for supplying an storage capacitive to pixels. In this case, the alignment film rises on the display electrode due to the partial presence of the storage capacitive electrode under the display electrode, to form the aforementioned inclined surface. In order to electrically insulate the storage capacitive electrode from the display electrode, an insulating layer is provided between these electrodes.

Also in the inclined surface which is formed on the alignment film due to the presence of the storage capacitive electrode under the display electrode, the angle of inclination with respect to the flat surface portion of the alignment film is set to be not more than 10.5°, preferably not more than 7°. Thus, it is possible to provide an active matrix liquid crystal display which can effectively suppress formation of reverse regions, effectively improve the ratio of a light transmitting portion to a light intercepting portion in transmittance, i.e., the contrast, and display clear images.

According to a further specific aspect of the present invention, the storage capacitive electrode consists of a polycrystalline silicon layer, the insulating layer consists of a composite layer which is formed by stacking BPSG and SOG layers with each other. In this case, the BPSG layer is deposited on the polycrystalline silicon layer which can be heated, whereby flattening is facilitated by thermal melting. In addition, the BPSG layer forms the insulating layer, whereby the withstand voltage across the display and storage capacitive electrodes can be improved.

According to a further specific aspect of the present invention, a substrate covering film is formed between the worked polycrystalline silicon layer and the first substrate. Thus, the substrate covering film is present under the worked polycrystalline silicon layer, whereby the substrate is hardly opaqued by etching or influenced by irregularity. Thus, a bad influence exerted by etching of the polycrystalline silicon layer or irregularity of the substrate can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
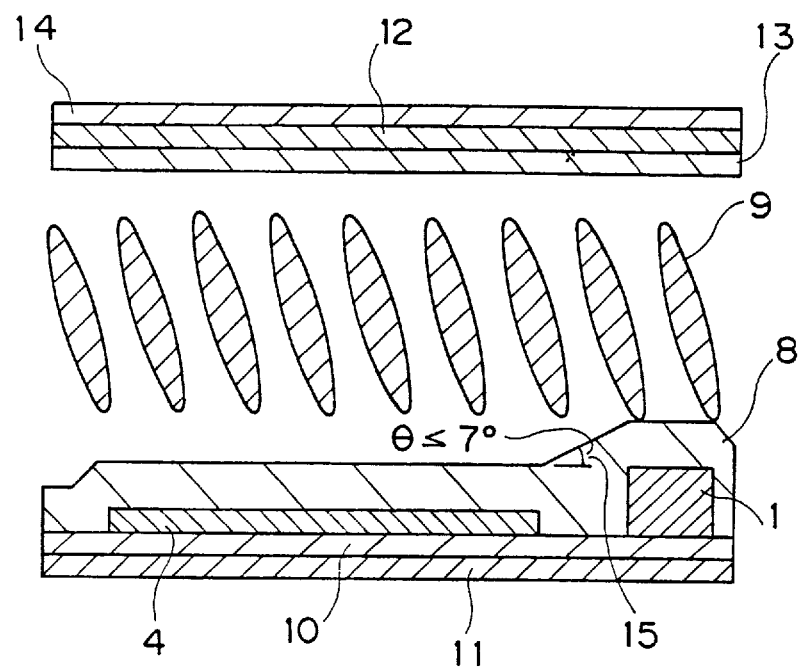
FIG. 1 is a sectional view of an active matrix liquid crystal display according to an embodiment of the present invention, which is provided with an alignment film having a smooth inclined surface.
Figure 10:
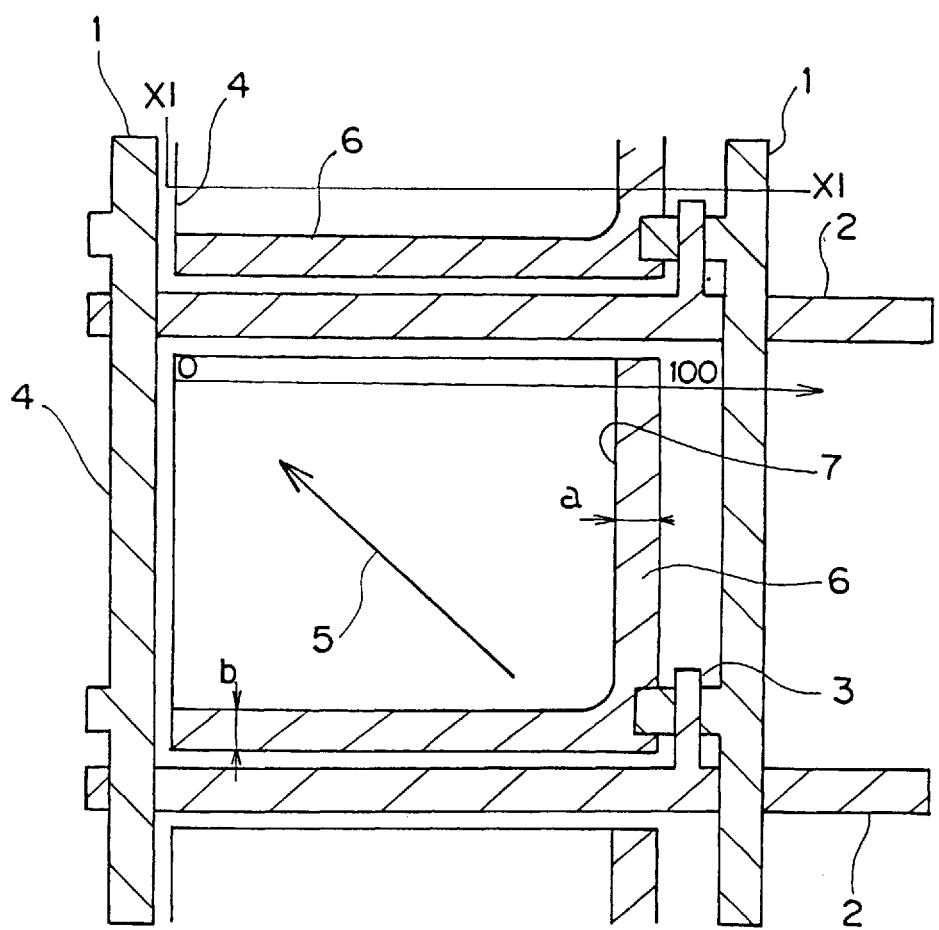
FIG. 10 is a plan view for illustrating a conventional active matrix liquid crystal display, which is formed with reverse regions.
Figure 11:
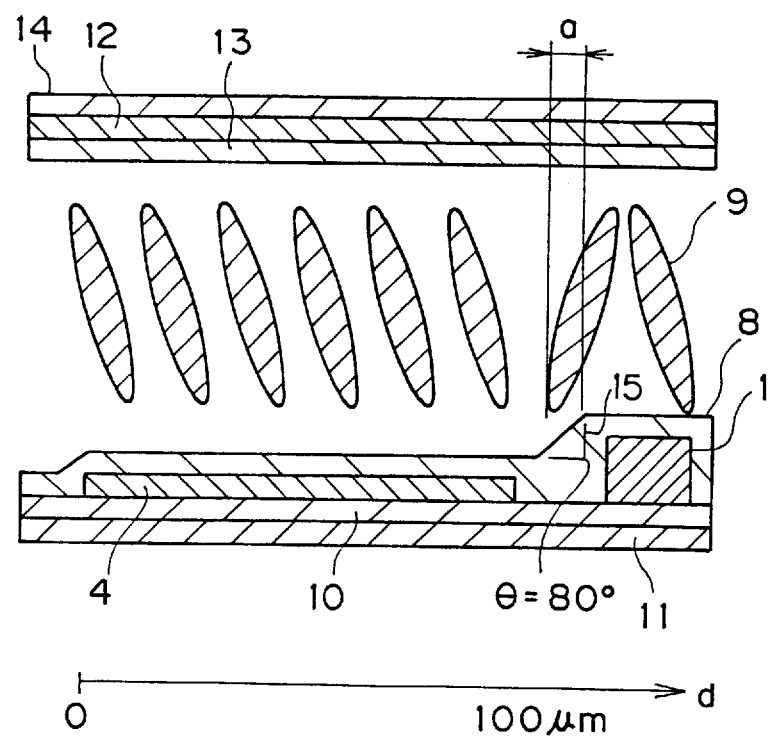
FIG. 11 is a sectional view of the conventional active matrix liquid crystal display, which is formed with reverse regions.

FIG. 1 is a partially fragmented sectional view of an active matrix liquid crystal display according to an embodiment of the present invention, in correspondence to FIG. 11 showing the conventional liquid crystal display appearing in FIG. 10.

A gate insulating film 10 is formed on a quartz glass TFT substrate 11 having surface roughness of not more than 0.3 $\mu$m for serving as a first substrate. The TFT substrate is so structured that a thin film transistor as an active circuit element is formed on a substrate member. The transistor controls transmission of video signals from a video line described hereinafter. A plurality of transparent display electrodes 4 of ITO, which are 700 Å in thickness, are provided on the gate insulating film 10. The display electrode 4 is electrically connected to the thin film transistor. A single-layer alignment film 8 of polyimide having a smooth surface, which characterizes the present invention, is provided to cover the display electrodes 4.

On the other hand, a transparent counter electrode 12 of ITO is formed on the overall lower surface of a low alkali glass counter substrate 14 serving as a second substrate, while a counter alignment film 13 of polyimide is provided on the counter electrode 12. Liquid crystals 9 are charged between the alignment film 8 and the counter alignment film 13.

The alignment film 8 has a thickness of 2 $\mu$m, and is formed on the overall surface of the TFT substrate 11, except a portion of ITO which is connected to the counter electrode 12 on the TFT substrate 11.

A video line 1 is formed on a side of each display electrode 4. The plan shapes of the display electrodes 4 and the video lines 1 are similar to those shown in FIG. 10.

When a pair of polarizing plates (HC2-8218 (trade name) by Kabushiki Kaisha Sanrittsu) (not shown in FIG. 1) are employed and the alignment film 8 is formed in a thickness of 1000 Å, parallel transmittance expressed in terms of transmittance T of 100% is slightly reduced but still maintained at a high level of 98%.

In a region between each display electrode 4 of 700 Å in thickness and each video line 1 of 2 μm in thickness, the surface of the alignment film 8 is set at an angle θ of inclination of 7° with respect to the display electrode 4. In this case, all reverse regions on the display electrodes 4 disappear.

Each of scanning lines (not shown) is 2000 Å in thickness. Under such a condition that the video line 1 is larger in thickness than the scanning line, a dropout distance b on the scanning line side automatically disappears when a dropout distance a on the video line 1 side is gone.

Description is now made on how the aforementioned dropout distance a on the video line 1 side in the upper region of the display electrode 4 of the active matrix liquid crystal display is changed with respect to the angle θ of inclination on the surface of the alignment film 8.

Figure 2:
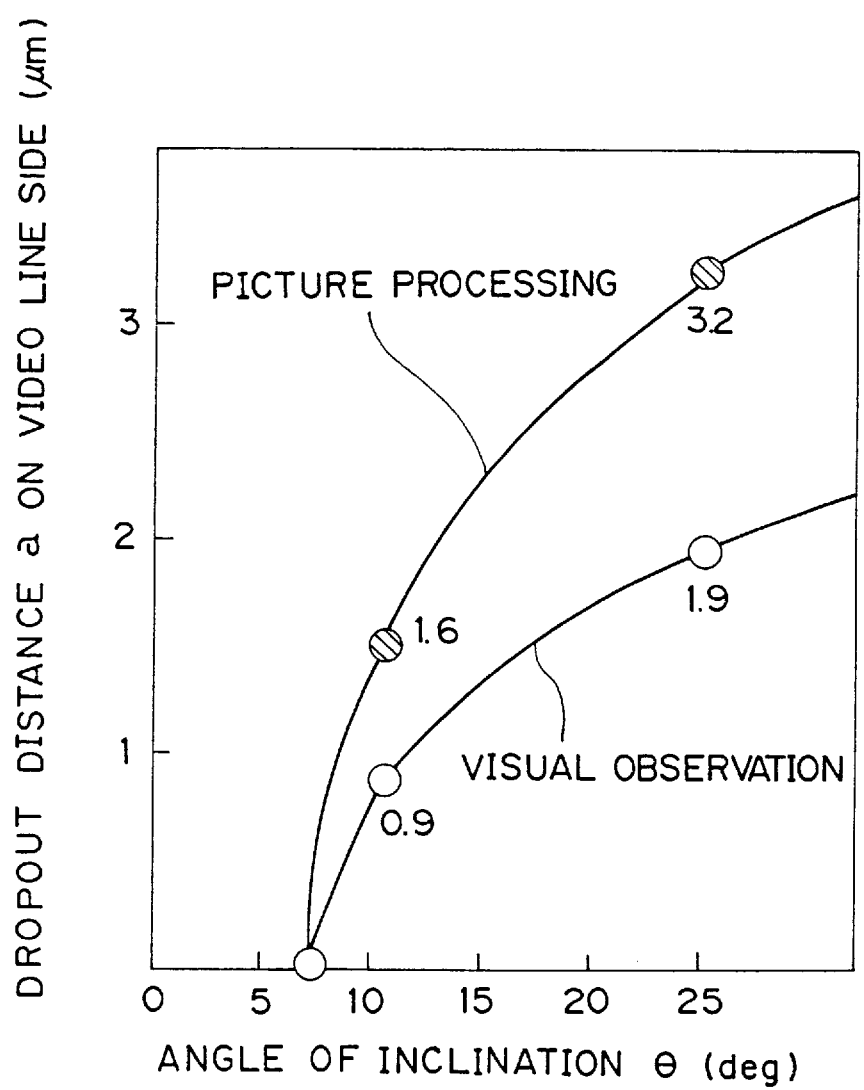
FIG. 2 is a characteristic diagram showing change of a dropout distance in relation to an angle of inclination of an alignment film.

FIG. 2 is a characteristic diagram showing how the dropout distance a on the video line side disappears when the angle of inclination of the alignment film 8 in the active matrix liquid crystal display according to the present invention is reduced.

As shown in FIG. 2, the dropout distance a on the video line side is 3.2 μm in picture processing data and 1.9 μm in visual evaluation, when the angle θ of inclination is 25°.

When the angle θ of inclination is 10.5°, on the other hand, the dropout distance a is 1.8 μm in the picture processing data and 0.9 μm in the visual evaluation, and inconspicuous.

When the angle θ of inclination is 7°, further, the dropout distance a is 0.1 μm in the picture processing data and 0 μm in the visual evaluation, whereby reverse regions disappear on the display electrodes.

Thus, no reversal is caused and the contrast of the active matrix liquid crystal display is improved when the angle θ of inclination of the alignment film is set below 10.50°, preferably 7°, according to the present invention.

Figure 3:
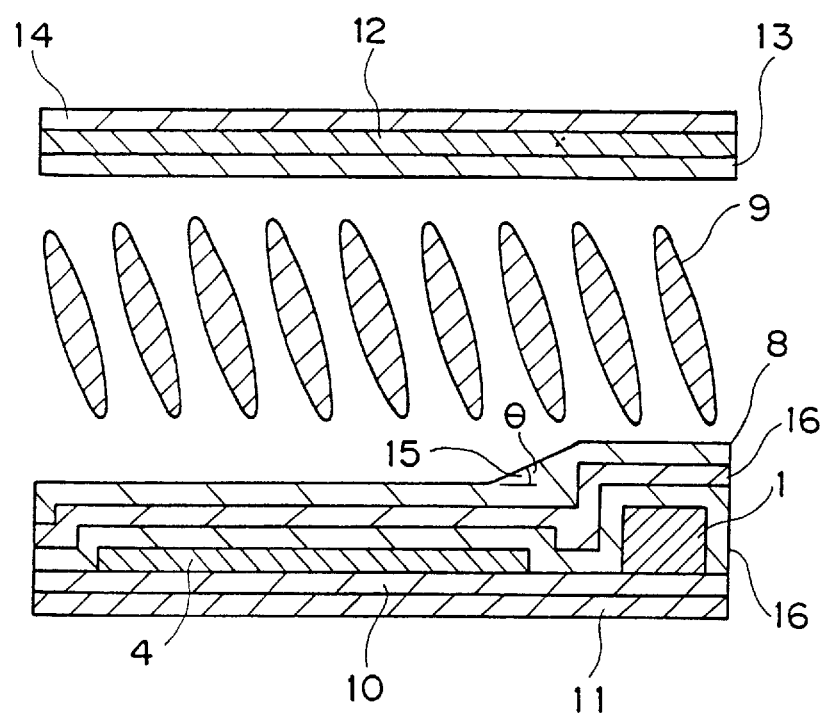
FIG. 3 is a sectional view showing an active matrix liquid crystal display according to another embodiment of the present invention, which is provided with an SOG layer.

Another embodiment of the present invention is now described. FIG. 3 is a sectional view showing an active matrix liquid crystal display having a SOG layer which is formed by a spin-on-glass method on each display electrode.

As shown in FIG. 3, the SOG layer 16 of $SiO_2$ which is formed by a spin-on-glass method cover each display electrode 4, a gate insulating film 10 and each video line 1, while a polyimide alignment film 8 of 3000 Å in thickness is further formed on the SOG layer 16.

The SOG layer 16 is a layer of 600 Å in thickness which is obtained by spin-coating a dilute solution of organic silicon resin at a temperature of 20° C. and thereafter firing the same at a temperature of 180° C. for a heating time of 30 minutes.

The feature of this embodiment resides in that the SOG layer 16 which is formed by the spin-on-glass method are thickly fired in the regions between the display electrode 4 and the video line 1 as compared with those on the display electrode 4, and the surface of the alignment film 8 which is deposited on the SOG layer is extremely smoothed, so that the reverse region over the display electrode disappears.

According to the structure shown in FIG. 3, the inventive active matrix liquid crystal display attains high transmittance of 99.5% when a pair of polarizing plates (HC2-8218 (trade name) by Kabushiki Kaisha Sanrittsu) are employed.

Figure 12:
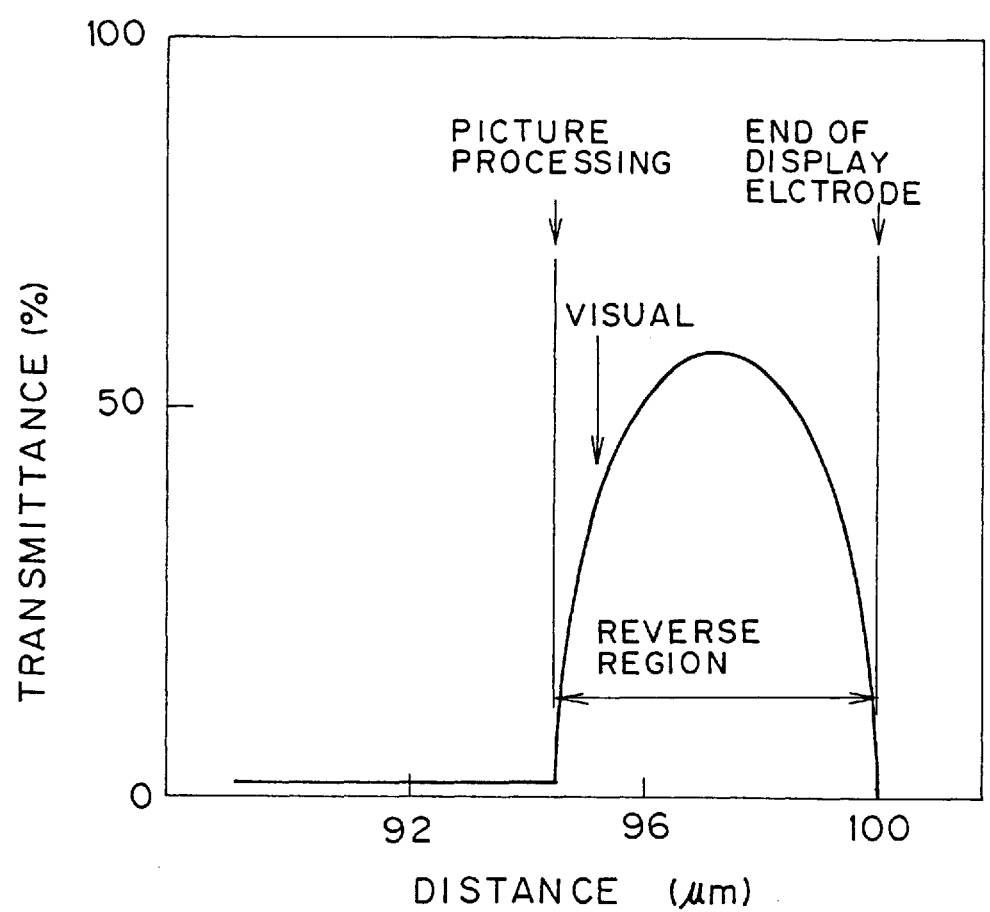
FIG. 12 illustrates transmittance characteristics on a display electrode in the conventional active matrix liquid crystal display.

Illustration is made on where a reverse region appears on each display electrode due to presence of the SOG layer, for the purpose of contrast with the example described with reference to FIGS. 10 to 12.

Figure 4:
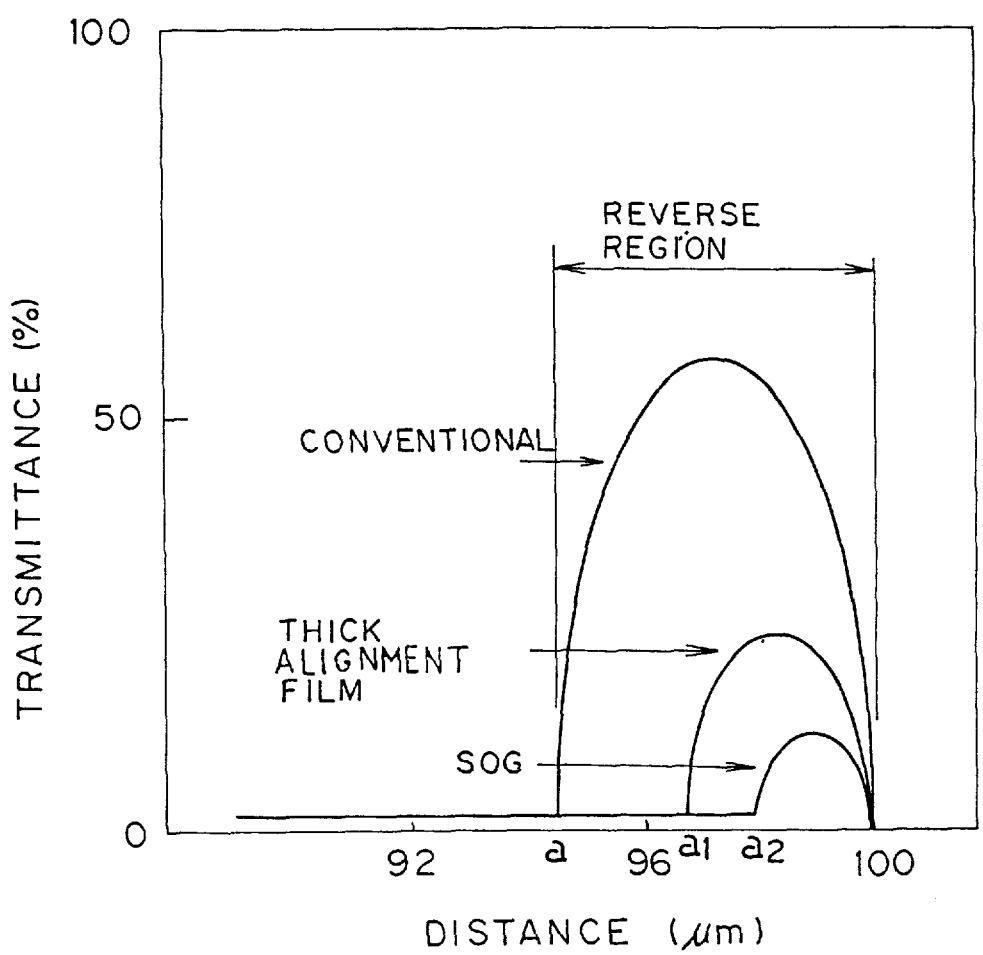
FIG. 4 illustrates transmittance characteristics of the liquid crystal display according to the embodiment shown in FIG. 3.

FIG. 4 is a transmittance-to-distance characteristic diagram showing such a state that a region having abnormal transmittance T formed around a display electrode which is closer to a video line is reduced due to presence of an SOG layer and that the abnormal transmittance T becomes to be small.

It is understood from FIG. 4 that a white-dropout region which appears around the display electrode as well as the transmittance are reduced as a>a1>a2 due to increase of an alignment film and presence of the SOG layer.

Still another embodiment of the present invention is now described.

Figure 5:
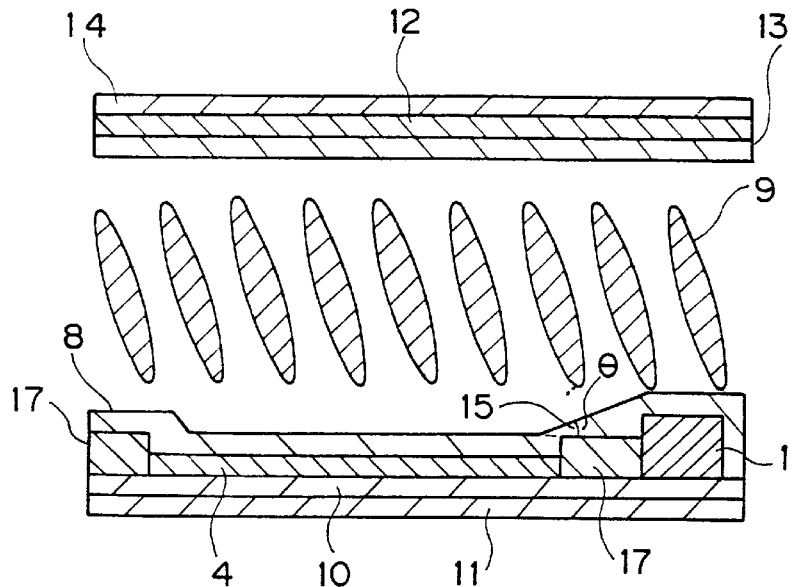
FIG. 5 is a sectional view of an active matrix liquid crystal display according to still another embodiment of the present invention, which is provided with an insulating layer between electrodes.

FIG. 5 is a sectional view showing an active matrix liquid crystal display according to this embodiment, having an insulating layer which is larger than each display electrode and smaller than each video line in thickness between the display electrode and the picture electrode.

As shown in FIG. 5, an insulating layer 17 of photosensitive polyimide having a thickness of 1.2 μm is formed between a display electrode 4 and a video line 1, while a polyimide alignment film 8 of 2000 Å in thickness is further deposited thereon.

The insulating layer 17 of photosensitive polyimide is formed on the overall surface of a TFT substrate by printing, and thereafter developed through difference between developing speeds which are varied with thicknesses.

Namely, the photosensitive polyimide tends to remain on a stepped portion between electrodes, and hence a step of leaving the remaining photosensitive polyimide in a tapered or stepwise manner after development is provided.

Due to formation of the insulating layer 17 and the alignment film 8 of the aforementioned thicknesses, reversal regions on the display electrodes are gone and the contrast of the liquid crystal display is improved by 10%.

According to the structure shown in FIG. 5, the inventive active matrix liquid crystal display attains relatively high transmittance of 98.5% when a pair of polarizing plates (HC2-8218 (trade name) by Kabushiki Kaisha Sanrittsu) are employed.

Figure 6:
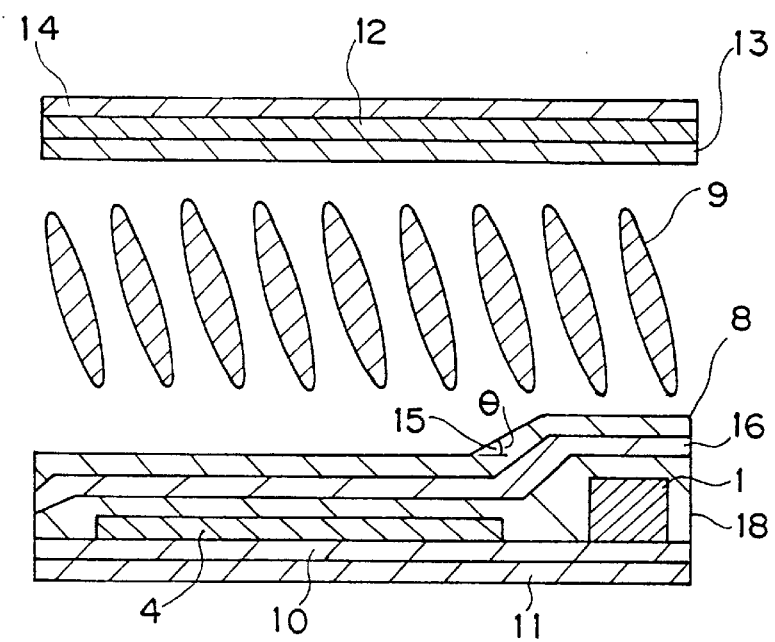
FIG. 6 is a plan view showing an active matrix liquid crystal display according to a further embodiment of the present invention, which is provided with a BPSG layer.

FIG. 6 is a sectional view showing an active matrix liquid crystal display according to a further embodiment of the present invention, which is provided with two insulating layers including a BPSG layer and an SOG layer between each display electrode and each video line.

Referring to FIG. 6, a BPSG layer 18 which is prepared by CVD is formed on each display electrode 4 of ITO. The BPSG layer 18 is heated to about 400° C. after formation, thereby being improved in adhesion to an underlayer and flatness on its surface.

Although an SOG layer 16 has slightly large time change of its withstand voltage, characteristics of a driving element are stabilized without varying in time due to the two-layer structure with the BPSG layer 18.

Figure 13:
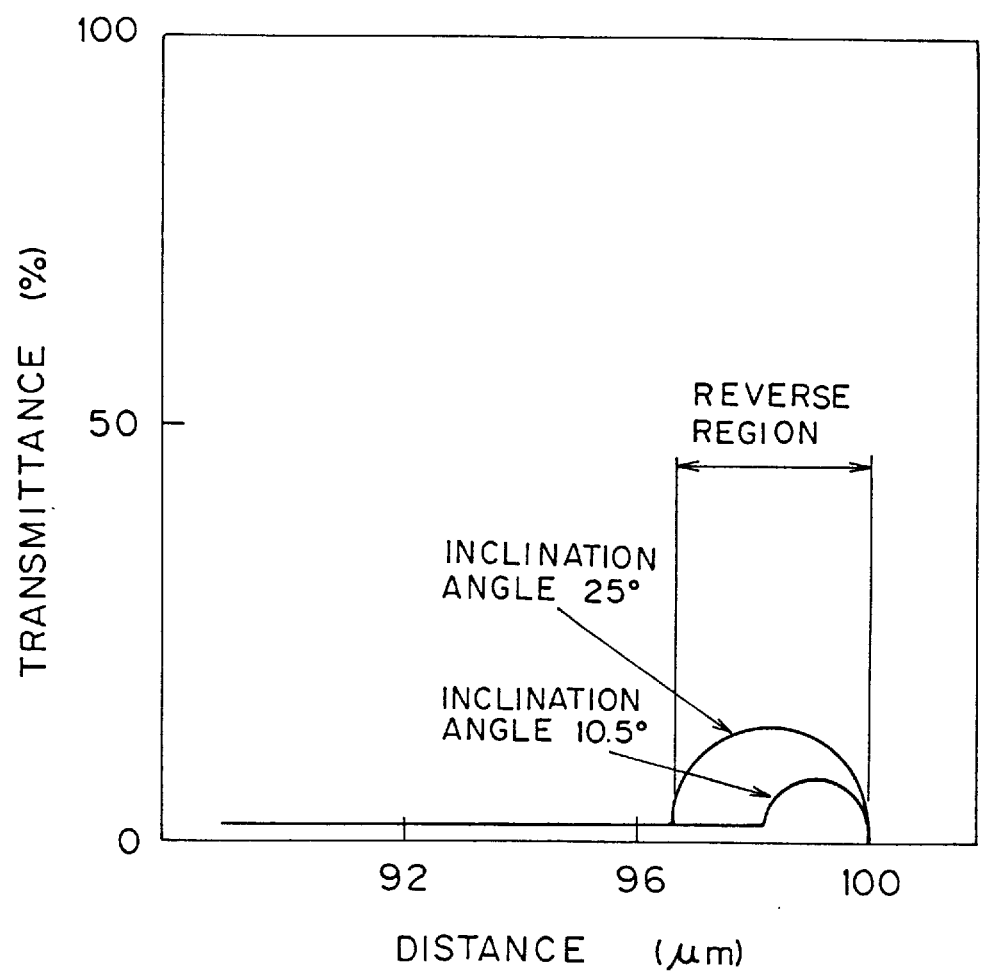
FIG. 13 illustrates transmittance-to-distance characteristic diagram showing such a state that a region having abnormal transmittance T formed around a display electrode closer to a video line is reduced due to presence of a SOG layer and a BPSG layer and that the abnormal transmittance T becomes to be small.

FIG. 13 illustrates transmittance-to-distance characteristic diagram showing such a state that a region having abnormal transmittance T formed around a display electrode closer to a video line is reduced due to presence of a SOG layer and a BPSG layer and that the abnormal transmittance T becomes to be small. In FIG. 13, the characteristic when the inclination angles are 10.5° and 7° are shown.

Figure 7:
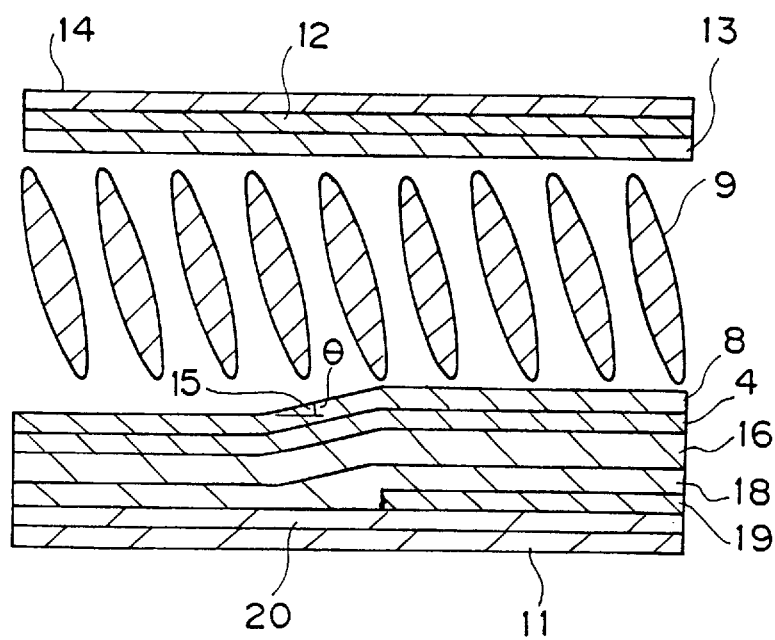
FIG. 7 is a plan view showing an active matrix liquid crystal display according to a further embodiment of the present invention, which is provided with a p-Si layer.

FIG. 7 is a sectional view of an active matrix liquid crystal display according to a further embodiment of the present invention, which is provided with two insulating layers of BPSG and SOG layers between a polycrystalline silicon layer and each display electrode.

Referring to FIG. 7, the polycrystalline silicon layer, i.e., a p-Si layer 19, serves as an storage capacitive electrode, and holds two insulating layers consisting of a BPSG layer 18 and an SOG layer 16 between the same and a display electrode 4. Referring to FIG. 7, the thickness of the p-Si layer 19 is set at 0.3 $\mu$m, while that of liquid crystals 9 is set at 4.6 $\mu$m. A substrate covering film 20 is shown in FIG. 7 to be disposed between p-Si layer 19 and the substrate 11.

Table 2 shows how an inclination angle 15 of surfaces of alignment films 8 in the embodiment is flattened in response to thickness of SOG layer.

TABLE 2

| | Thickness of SOG Layer (Å) | | | |
|---|---|---|---|---|
| | 0 | 2000 | 4000 | 6000 |
| Angle of Inclination θ | 25.0 | 10.5 | 7.0 | 6.5 |

In the example described with reference to FIG. 10, the alignment film of 1000 Å in thickness has a considerably large angle of inclination. When the alignment film of 3000 Å in thickness is employed, on the other hand, the angle θ of inclination is reduced to 25° with formation of no SOG films, as shown in Table 2.

However, it is understood from the characteristic diagram of FIG. 2 that the aforementioned SOG layers are necessary since the dropout distance a on the storage capacitive electrode side reaches 1.9 $\mu$m in visual observation when the angle θ of inclination is 25°.

When a SOG layer of 2000 Å is formed, for example, the angle of inclination is reduced to 10.5°, and the dropout distance a on the storage capacitive electrode side is 0.9 $\mu$m with reference to FIG. 2.

When the SOG layer of 4000 Å in thickness are formed, the angle of inclination is reduced to 7.0°, the dropout distance a on the storage capacitive electrode side is gone from FIG. 2, and reverse regions on the display electrodes disappear.

While Table 2 shows that the angle of inclination is 6.5° when the SOG layer of 6000 Å in thickness are formed, it is understood that this value is not much different from that in the case of 4000 Å but substantially saturated.

In each of the embodiments described above with reference to FIGS. 1 to 7, the surface of the alignment film 8 is inclined in a region between the display electrode and the video line due to the presence of the video line or due to the presence of the storage capacitive electrode, at a smooth angle of inclination. However, the present invention is also applicable to an inclined surface of an alignment film resulting from presence of another electrode which is partially provided under a display electrode or on a side of the display electrode. Such an embodiment is described with reference to FIGS. 8 and 9.

Figure 8:
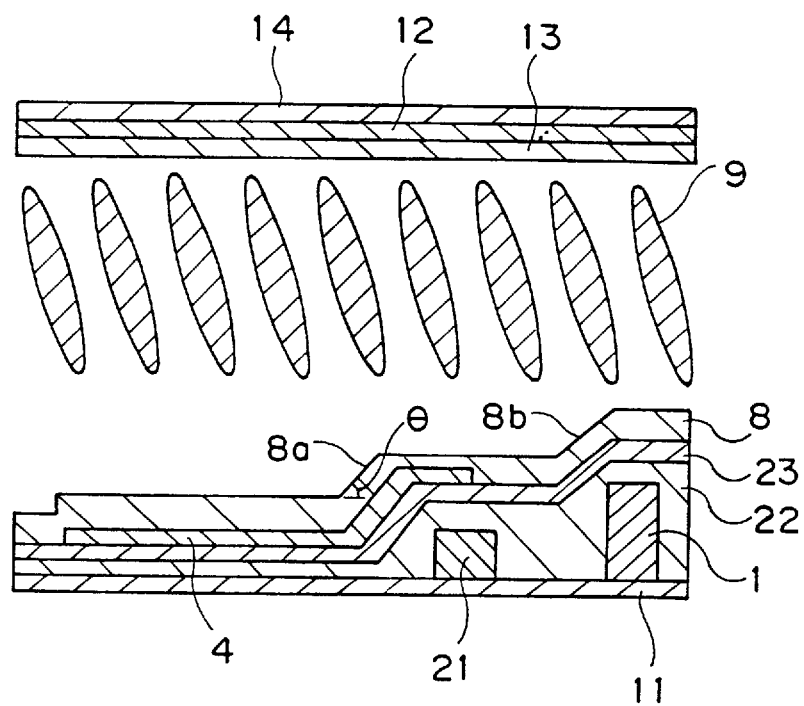
FIG. 8 is a sectional view showing an active matrix liquid crystal display according to a further embodiment of the present invention.

An active matrix liquid crystal display shown in FIG. 8 is substantially similar in structure to that shown in FIG. 1. Therefore, portions which are identical to those shown in FIG. 1 are denoted by the same reference numerals, to omit redundant description.

Figure 9:
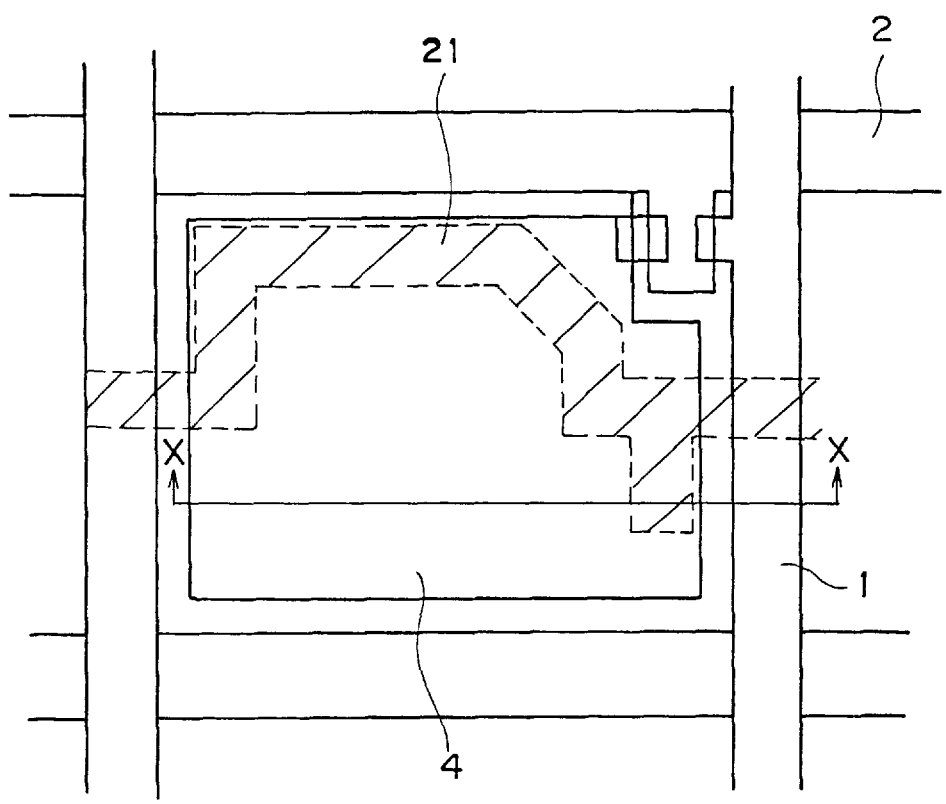
FIG. 9 is a plan view showing a principal part of the active matrix liquid crystal display appearing in FIG. 8.

In the active matrix liquid crystal display shown in FIGS. 8 and 9, an storage capacitive electrode 21 is partially formed under a display electrode 4. Namely, the storage capacitive electrode 21 and a video line 1 are formed on an upper surface of a TFT substrate 11 serving as a first substrate. Further, a BPSG layer 22 is formed to cover the storage capacitive electrode 21 and the video line 1, and an SOG layer 23 is formed on the BPSG layer 22. The BPSG layer 22 and the SOG layer 23 form an insulating layer, for electrically insulating the storage capacitive electrode 21 from the display electrode 4.

While the display electrode 4 is formed on the SOG layer 23, an inclined surface 8a is formed on a surface of an alignment film 8, since the storage capacitive electrode 21 is partially present under the display electrode 4. Namely, the inclined surface 8a is formed over a region from a flat surface portion of the alignment film 8 toward a portion above the storage capacitive electrode 21. According to this embodiment, the angle of inclination of the inclined surface 8a, i.e., the angle of inclination of the alignment film 8 with respect to the principal flat portion above the display electrode 4, is set to be not more than 10.5°, preferably not more than 7°. Thus, reverse orientation of liquid crystals caused by the presence of the inclined surface 8a can be effectively suppressed.

Another inclined surface 8b is formed on the alignment film 8, also in the vicinity of the video line 1. This inclined surface 8b is set at an angle of inclination of not more than 10.5°, preferably not more than 7° similarly to the case of the aforementioned embodiment, thereby effectively suppressing reverse orientation of the liquid crystals caused by the presence of the inclined surface 8b, similarly to the embodiment shown in FIG. 1.

According to the present invention, as hereinabove described, the angle of inclination of the inclined surface formed on the alignment film due to the presence of the electrode such as the storage capacitive electrode which is partially present under the display electrode or the electrode such as the video line which is present on a side of the display electrode is smoothed to be not more than 10.5°, preferably not more than 7°, whereby formation of reverse regions can be effectively suppressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An active matrix liquid crystal display comprising:
    a first substrate;
    a display electrode formed on said first substrate;
    a video line electrode formed on a side of said display electrode on said first substrate;
    an insulating layer formed between said display electrode and said video line, said insulating layer being larger than said display electrode and smaller than said video line in thickness;
    an alignment film formed to cover said display electrode;
    a second substrate opposed to said first substrate;
    a counter alignment film formed on a surface of said second substrate facing said first substrate; and
    liquid crystals held between said alignment film and said counter alignment film, said alignment film having a surface inclined from a flat surface portion above said display electrode toward a portion of said alignment film above said video line electrode, an angle of inclination of said inclined surface of said alignment film being set to be not more than 10.5 degrees with respect to said flat surface portion of said alignment film.

2. An active matrix liquid crystal display comprising:

a first substrate;

a display electrode formed on said first substrate;

a video line electrode formed on a side of said display electrode on said first substrate;

an alignment film formed to cover said display electrode;

a BPSG layer and a SOG layer formed between said display electrode and said alignment film;

a second substrate opposed to said first substrate;

a counter alignment film formed on a surface of said second substrate facing said first substrate; and liquid crystals held between said alignment film and said counter alignment film, said alignment film having a surface inclined from a flat surface portion above said display electrode toward a portion of said alignment film above said video line electrode, an angle of inclination of said inclined surface of said alignment film set to be not more than 10.5 degrees with respect to said flat surface portion of said alignment film.

3. An active matrix liquid crystal display comprising:

a first substrate;

a display electrode formed on said first substrate;

a storage capacitive electrode consisting of a polycrystalline silicon layer, wherein said storage capacitive electrode is partially formed under said display electrode;

an insulating layer comprising alternating BPSG and SOG layers, wherein said insulating layer is disposed between said storage capacitive electrode and said display electrode;

an alignment film formed to cover said display electrode;

a second substrate opposed to said first substrate;

a counter alignment film formed on a surface of said second substrate facing said first substrate; and liquid crystals held between said alignment film and said counter alignment film, said alignment film having a surface inclined from a flat surface portion above said display electrode toward a portion of said alignment film above said storage capacitive electrode, an angle of inclination of said inclined surface of said alignment film being set to be not more than 10.5 degrees with respect to said flat surface portion of said alignment film.

4. The active matrix liquid crystal display in accordance with claim 3, further comprising a substrate covering film disposed between said polycrystalline layer and said first substrate.

* * * * *

UNITED STATES PATENT AND TRADEMARK OFFICE
CERTIFICATE OF CORRECTION

PATENT NO. : 5,880,802
DATED : March 9, 1999
INVENTOR(S) : Kouno et al.

It is certified that error appears in the above-identified patent and that said Letters Patent is hereby corrected as shown below:

On the title page, item [75],:

line 1, delete "Susumo" insert therefor --Susumu--

Signed and Sealed this

Twentieth Day of July, 1999

Attest:

Q. TODD DICKINSON

Attesting Officer

Acting Commissioner of Patents and Trademarks